United States Patent Office 3,406,020
Patented Oct. 15, 1968

3,406,020
ABRASIVE WHEELS COMPRISING A NOVOLAK RESIN AND A THERMOPLASTIC POLYHYDROXYETHER
William J. D'Alessandro, East Brunswick, N.J., assignor to Union Carbide Corporation, a corporation of New York
No Drawing. Continuation-in-part of application Ser. No. 394,617, Sept. 4, 1964. This application May 11, 1967, Ser. No. 637,631
6 Claims. (Cl. 51—298)

ABSTRACT OF THE DISCLOSURE

Improved abrasive compositions for fabricating grinding wheels were formulated from abrasive grains, a solid novolak resin and hardener therefor, and a thermoplastic polyhydroxyether reaction product of a dihydric phenol and epichlorohydrin. Wetting agents such as a heat hardenable resole resin, furfural and furfuryl alcohol can be added to facilitate mixing.

---

This is a continuation-in-part of U.S. application Ser. No. 394,617 filed Sept. 4, 1964, now abandoned.

This invention relates to abrasive compositions and to improved abrasive structures made therefrom. More particularly, the invention relates to abrasive structures exhibiting improved flexural strength and toughness at both room temperatures and at elevated temperatures.

Abrasive structures such as grinding wheels, snagging wheels and the like desirably have good flexural strength and toughness at room temperatures to prevent, for example, bursting apart due to centrifugal forces. A technique proposed for improving the toughness and flexural strength of abrasive structures has been the incorporation of thermoplastic materials such as polyvinyl acetals and other vinyl resin modifiers (polyvinyl chloride and vinyl chloride copolymers). In use, however, abrasive structures become quite hot. Addition of these materials reduces to unacceptably low levels the strength of abrasive structures at their usual use temperatures. Low limits on use temperature necessitate slow grinding speeds and are otherwise undesirable.

It is an object, therefore, of the present invention to provide abrasive compositions.

It is another object to provide abrasive structures wherein both room temperature and elevated temperature flexural strength and toughness are improved.

It is another object to provide method for improving the room temperature and elevated temperature flexural strength and toughness of abrasive structures.

It has now been found that these and other objects of the present invention are achieved with hardenable abrasive compositions comprising: (a) a major amount of abrasive grains selected from the group consisting of aluminum oxide, natural corundum, silicon carbide and diamond; (b) a binding amount of a solid novolak resin; (c) about 2 to 50% by weight of a methylene engendering novolak hardening agent, based on the weight of said novolak; (d) from 0 to about 100 parts per hundred parts of said novolak of at least one wetting agent selected from the group consisting of liquid resole resin, cresol furfural, and furfuryl alcohol; (e) from about 0.5 to 60 parts per hundred parts of said novolak of a thermoplastic polyhydroxyether reaction product of substantially equimolar amounts of a dihydric phenol and epichlorohydrin, said thermoplastic polyhydroxyether having a degree of polymerization of at least 30 and; (f) from 0 to about 200 parts per hundred parts of said novolak of filler.

Quite surprisingly, it is found that the incorporation of thermoplastic polyhydroxyether in abrasive compositions confers improvements in flexural strength and toughness on the order of 50 percent at room temperatures rather than the normal 10–20 percent improvement associated with thermoplastic additives.

It is, however, completely unpredictable that this thermoplastic additive rather than detracting from the high use temperature properties of the hardened abrasive structure as do other thermoplastic additives actually improves flexural strength and toughness approximately 50 percent at 260° C. and higher.

These remarkable increases in flexural strength are illustrated quantitatively in the following table wherein abrasive structures identical except that "A" was made using a widely employed heat resistant unmodified phenolic resin binder and "B" was made using a modified phenolic resin binder according to the present invention, prepared as in Example 1, are compared.

TABLE I

| Test Temperature | Flexural Strength, p.s.i. | | Actual Percent Improvement B over A |
|---|---|---|---|
| | A | B | |
| 25° C | 3,553 | 5,553 | +56 |
| 260° C | 1,598 | 2,344 | +46 |
| 290° C | 1,246 | 1,950 | +56 |

The term "thermoplastic polyhydroxyether" herein refers to substantially linear polymers which are reaction products of substantially equimolar amounts of a dihydric phenol and epichlorohydrin, said thermoplastic polyhydroxyether having a degree of polymerization of at least 30 and preferably 80 or more. The term "thermoplastic polyhydroxyether" is intended to include mixtures of at least two thermoplastic polyhydroxyethers.

The dihydric phenol contributing the phenol radical residuum D, can be either a dihydric mononuclear phenol such as hydroquinone and resorcinol or a dihydric polynuclear phenol such as those having the general formula

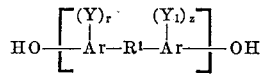

wherein Ar is an aromatic divalent hydrocarbon such as naphthylene and, preferably, phenylene, Y and $Y_1$ which can be the same or different are alkyl radicals, preferably having from 1 to 4 carbon atoms, halogen atoms, i.e. fluorine, chlorine, bromine and iodine, or alkoxy radicals, preferably having from 1 to 4 carbon atoms, $r$ and $z$ are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or is a divalent radical including, for example,

—O—, —S—, —SO—, —$SO_2$—, and —S—S—, and divalent hydrocarbon radicals such as alkylene, alkylidene, cycloaliphatic e.g. cycloalkylene and cycloalkylidene, halogenated, alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include, among others:

The bis(hydroxyphenyl)alkanes such as
2,2-bis(4-hydroxyphenyl)propane,
2,4-dihydroxydiphenylmethane,
bis-(2-hydroxyphenyl)methane,
bis(4-hydroxyphenyl)methane,
bis-(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorophenyl)ethane,
1,1-bis(3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis(4-hydroxynaphthyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane,
1,2-bis(4-hydroxyphenyl-1,2-bis(phenyl)propane,
2,2-bis(4-hydroxyphenyl)-1-phenyl-propane and the like;

di(hydroxyphenyl)sulfones such as bis(4-hydroxyphenyl)-sulfone, 2,4'-dihydroxydiphenyl sulfone, 5'-chloro-2,4'-dihydroxydiphenyl sulfone, 5'-chloro-4,4'-dihydroxydiphenyl sulfone, and the like;

di(hydroxyphenyl)ethers such as
bis(4-hydroxyphenyl)ether,
the 4,3'-, 4,2'-, 2,2'-, 2,3'-, dihydroxydiphenyl ethers,
4,4'-dihydroxy-2,6-dimethyldiphenyl ether,
bis(4-hydroxy-3-isobutylphenyl)ether,
bis(4-hydroxy-3-isopropylphenyl)ether,
bis(4-hydroxy-3-chlorophenyl)ether,
bis(4-hydroxy-3-fluorophenyl)ether,
bis(4-hydroxy-3-bromophenyl)ether,
bis(4-hydroxynaphthyl)ether,
bis(4-hydroxy-3-chloronaphthyl)ether,
bis(2-hydroxydiphenyl)ether,
4,4'-dihydroxy-2,6-dimethoxydiphenyl ether,
4,4'-dihydroxy-2,5-diethoxydiphenyl ether, and the like;

Also suitable are the bisphenol reaction products of 4-vinylcyclohexene and phenols, e.g. 1,3-bis(p-hydroxyphenyl)-1-ethylcyclohexane, and the bisphenol reaction products of dipentene or its isomers and phenols such as 1,2-bis(p-hydroxyphenyl)-1-methyl-4-isopropylcyclohexane as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula

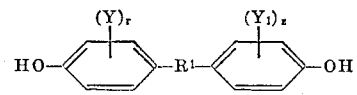

wherein Y and $Y_1$ are as previously defined, $r$ and $x$ have values from 0 to 4 inclusive and $R^1$ is a divalent saturated aliphatic hydrocarbon radical, particularly alkylene and alkylidene radicals having from 1 to 3 carbon atoms, and cycloalkylene radicals having up to and including 10 carbon atoms.

Mixtures of dihydric phenols can also be employed and whenever the term "dihydric phenol" or "dihydric polynuclear phenol" is used herein mixtures of these compounds are intended to be included.

The thermoplastic polyhydroxyethers of the present invention are substantially free of 1,2-epoxy groups as evidenced by the application of the two "epoxide equivalent" analytical tests described in "Epoxy Resins" by H. Lee and K. Neville, pages 21–25, McGraw Hill Book Co., Inc., N.Y. 1957). In the first test which involves the reaction of 1,2-epoxy groups with a known amount of hydrochloric acid followed by back-titration of the acid consumes, no hydrochloric acid was consumed. In the second test in which the infrared absorbence at 10.95 and 11.60μ (wave lengths at which 1,2-epoxy groups absorb light) no absorbence was demonstrated by the thermoplastic polyhydroxyethers. Thus it may be concluded that within the experimental limits of these standard tests no 1,2-epoxy groups are present in these thermoplastic polyhydroxyethers.

Curing agents, for example, amines, such as imidazole and N,N-dimethylbenzylamine have no curing or hardening effect on thermoplastic polyhydroxyethers in sharp contract with their effect on liquid or solid epoxy resins which are hardened into thermoset resins with such curing agents.

The thermoplastic polyhydroxyethers can be prepared by admixing from about 0.985 to about 1.015 moles of an epihaldohydrin with one mole of a dihydric phenol together with from about 0.6 to 1.5 moles of an alkali metal hydroxide, such as, sodium hydroxide or potassium hydroxide generally in an aqueous medium at a temperature of about 10° to about 50° C. until at least about 60 mole percent of the epihalohydrin has been consumed. The thermoplastic polyhydroxyethers thus produced have reduced viscosities of at least 0.43, generally from 0.43 to about 1 and preferably from about 0.5 to 0.7. Reduced viscosity values were computed by use of the equation:

$$\text{Reduced Viscosity} = \frac{t_s - t_0}{ct_0}$$

wherein $t_0$ is the efflux time of the solvent (tetrahydrofuran), $t_s$ is the efflux time of the polyhydroxyether solution, $c$ is the concentration of the polyhydroxyether solution in terms of grams of polyhydroxyether per 100 ml. of tetrahydrofuran solution.

The thermoplastic polyhydroxyether used was prepared by the reaction of equimolar amounts of 2,2-bis(4-hydroxyphenyl)propane and epichlorohydrin together with sodium hydroxide. Equipment used was provided with a sealed stirrer, thermometer and reflux condenser. There was placed therein:

| | Parts |
|---|---|
| 2,2-bis(4-hydroxyphenyl)propane (0.5 mole) | 114.5 |
| Epichlorohydrin (99.1%) pure | 46.8 |
| Ethanol | 96.0 |
| Butanol | 10.0 |
| Sodium hydroxide (97.5%) pure | 22.6 |
| Water | 70.0 |

The above mixture was stirred at room temperature for 16 hours to accomplish the initial coupling reaction. The mixture was then heated at 80° C. for an hour. Sixty milliliters of a 7:3 mixture of toluene:butanol was added. Heating of the mixture at 80° C. was continued another two hours. There was added an additional 50 parts of the 7:3 toluene:butanol mixture and 4.5 parts of phenol. The contents of the vessels were continued heated at 80° C. (reflux) for 2½ hours. Upon cooling, the reaction mixture was cut with 200 parts of the 7:3 toluene:butanol mixture. One hundred parts of water was added and agitated with the contents to dissolve salts present in the reaction mixture. The vessel contents were allowed to settle for ten minutes during which time a lower brine phase formed. This lower phase was separated by decantation. The upper polymer solution containing phase was washed successively with two 160 part portions of water containing 4.5% butanol. The washed polymer solution was acidified by stirring the solution with a mixture of 1 part of 85% phosphoric acid with 100 parts of water (pH=2) for one hour. The upper polymer solution phase was again separated by decantation and water washed with four successive 200 part portions of water containing 4.5% butanol. The washed polymer was then coagulated in 1,000 parts of isopropanol, filtered and dried. There was obtained a thermoplastic polyhydroxyether of 2,2-bis(4-hydroxyphenyl)

propane and epichlorohydrin having a melt flow of 7.0 decigrams per minute.

Melt flow of each of the thermoplastic polyhydroxyethers was determined by weighing in grams the amount of polyhydroxyether, which, at a temperature of 220° C. and under a pressure of 44 p.s.i., flowed through an orifice having a diameter of 0.0825" and a length of 0.315" over a ten minute period. Four such determinations were made and the average of the four determinations is reported as decigrams per minute under a pressure of 44 p.s.i., and at 220° C.

Thermoplastic polyhydroxyethers having melt flows between 0.5 and 20 and more particularly 2 to 7 provide excellent abrasive compositions and structures when incorporated in the phenolic resin bond according to the present invention.

The thermoplastic polyhydroxyether can contain one or more fillers, opacifiers, extenders, colorants or other additives conventional in thermoplastic technology and well-known to those in the art. These compositions can be prepared by any of the blending or mixing means conventionally used to mix or compound thermoplastics.

Heat hardenable phenolic resins which are used in the hardenable abrasive compositions having improved room temperature and elevated temperature strength are those resins generally employed in abrasive structures. Typical heat hardenable phenolic resins are phenol-aldehyde condensation products including amine modified phenol-aldehyde resins. It is essential, however, that the novolak form of phenolic resin be used in this invention in combination with hardeners. The resole form of phenolic resin can be optionally used in conjunction with novolaks as a wetting agent for the abrasive grains. A full description of these resins is given in the book entitled "The Chemistry of Phenolic Resins" by Robert W. Martin published in 1956 by John Wiley & Sons and also the book entitled "Phenoplasts" by T. S. Carswell published in 1947 by Interscience Publishers. These and other heat-hardenable resins are disclosed in U.S.P. 2,559,664 to Ries et al., U.S.P. 2,779,668 to Daniels et al. and U.S.P. 2,521,911 to Greenlee et al.

The term "phenol-aldehyde resin" herein refers to acid or base catalyzed thermosetting resins prepared from a phenol such as phenol, cresol, xylenol, p-t-butylphenol, p-phenylphenol, bisphenols and resorcinol and an aldehyde such as formaldehyde and furfural, such as described in U.S.P. 2,585,196 to Walton; U.S.P. 2,475,587 to Bender et al.; U.S.P. 2,557,922 to Mazzucchelli et al.; U.S.P. 2,617,785 to Pritchett et al.; U.S.P. 2,675,335 to Rankin et al. and U.S.P. 2,552,025 to Barr et al. The acid catalyzed resins are the novolaks and the base catalyzed resins are the resoles.

The term "binding amount" of solid novolak resin is used herein to mean an amount sufficient to bind the abrasive grains together. Quantitatively this amount lies in the range of about 1 to 48 percent of the total abrasive composition with 2 to 35% being a preferred range, 5 to 20% being a more preferred range and 6 to 15% the most preferred range.

Abrasive structures or articles according to the present invention are prepared in a preferred manner by blending together:

(1) A liquid resole resin or a resin solvent,
(2) A solid powdered novolak resin mixed with a hardening amount of methylene engendering hardening agent,
(3) The thermoplastic polyhydroxyether and
(4) Abrasive grains.

Abrasive grains which can be used include, metal oxides, typically aluminum oxides of, for example, #12, #14, or #16 mesh size, natural corundum and diamond, although other abrasive grains e.g., silicon carbide which have been coated with a wetting agent can also be used.

The amount of abrasive grains present in the compositions of this invention can vary between about 51 and 99 percent by weight of the total composition, but it is preferred to employ between about 70 and 95 percent. A particularly preferred range lies between about 75 and 90 percent. The most preferred range is about 77 to 90 percent.

The wetting agent for the grains can be a liquid heat-hardenable phenolic resin or a resin solvent such as furfuryl alcohol, furfural or cresol or a mixture of these or a solution of thermoplastic polyhydroxyether in an organic solvent such as a ketone as for example methyl-ethyl ketone, tetrahydrofuran, or dioxane, dimethylformamide, dimethyl sulfoxide and the like. This mix is pressed in a mold and hardened by cure due to the action of the hardening agent on the novolak and the self-reaction of the curable wetting agent if one is used. In this connection it is to be noted that the term "heat" in heat-hardenable is intended to include room temperatures (e.g., 25° C.).

The abrasive compositions and structures of the present invention can contain up to about 200 parts, per hundred parts by weight of novolak resin, of conventional fillers such as cryolite, flurospar, magnesium oxide, silica and other modifiers such as are well known in the art. The greater flexural strength of the abrasive structures of the present invention in fact indicates a possibly greater tolerance for such modifiers.

The preparation of abrasive structures in accordance with the present invention is generally similar to preparations heretofore known except for the use of thermoplastic polyhydroxyether. Previously known abrasive structures such as snagging wheels are generally formulated from abrasive grit, e.g., 780 parts of fused $Al_2O_3$ (260 parts each of #12, #14, and #16 mesh), filler e.g., cryolite and resin binder 120 parts. The binder comprises solid novolak resin and liquid wetting agent portions in a ratio generally of about 80 parts powdered novolak resin binder and about 40 parts liquid resin binder. In another known formulation the binder comprises 120 parts of solid novolak resin and about 10–20 parts of furfural wetting agent. The abrasive mix is blended into a free flowing mass by first coating the abrasive grit with the liquid binder (wetting agent) at room temperature. The cryolite filler and the powdery binder mixed with sufficient hardener e.g., hexamethylenetetramine are blended and this dry mix is tumbled with the wetted grit. Agglomerates are broken by passing through a screen. The abrasive mix should remain free flowing up to the time it is charged to the mold.

To prepare abrasive structures of the present invention thermoplastic polyhydroxyether can be employed in an amount of from about 0.5 parts to 60 by weight per 100 parts of novolak resin. It is preferred to employ from 0.5 to 50 parts of thermoplastic polyhydroxyether for ease of handling and balance of properties achieved therewith. Maximum hot strength (260° C.) and room temperature (25° C.) strengths are achieved with the use of 5 to 25 parts of thermoplastic polyhydroxyether and compositions within this range are particularly preferred for grinding wheel applications.

In one embodiment of the present invention, abrasive compositions are prepared by blending abrasive grit with a novolak resin and hardener therefore and the polyhydroxyether. Thus, pulverized heat hardenable resin can be tumbled, milled, blended, screw mixed or otherwise intimately commingled with pelleted, particulate or powdery thermoplastic polyhydroxyether. Dry mixes of thermoplastic polyhydroxyether and a novolak resin together with a hardening agent can be made prior to or after pulverizing the mass for abrasive structure manufacture.

Snagging, as defined on page 909 of the "Tool Engineers Handbook" published by McGraw-Hill Book Co., Inc. N.Y.C. in 1949, is primarily a metal-removing operation, characterized by manual application of pressure by the operator and used largely in foundries, welding and forge shops for grinding off sprues, gates, risers, headers, flash or excess weld material. It is also used in steel mills for rough grinding of sheet slab, bar, billet, and ingot shapes where hard or strong organic bond wheels are used.

The compositions of this invention are useful not only in grinding and snagging wheel fabrication, but also in other abrasive elements such as heavy duty sanding and finishing belts, cones, disks and the like.

The invention is further explained by the examples which follow in which all parts and percentages are by weight unless otherwise specified.

Example 1.—Preparation of abrasive test structures (a) Formula for dense snagging wheel structure—

| | Parts by weight |
|---|---|
| Fused aluminum oxide (Al$_2$O$_3$) abrasive grit (mixture of 260 parts each of #12, #14, and #16 mesh size) | 780 |
| Cryolite (filler) | 100 |
| Liquid phenolic resin [1] | 40 |
| Powdered resin [2] | 80 |

[1] 100–3000 cps. @ 25° C.—phenol-formaldehyde resole 1-step resin.
[2] Phenol-formaldehyde novolak 2-step resin : thermoplastic polyhydroxyether 88 : 12 mixture (10% hexamethylenetetramine based on total modified novolak).

The resin portion of the formulation is divided into liquid and powdered solid phenolic resins. For the control system, 40 parts of liquid phenolic resin, and 80 parts of powdered phenolic resins are used in the preparation of a free-flowing abrasive mix. The amount of liquid and powdered resin is adjusted to yield a dry free-flowing mix.

(b) Procedure.—Liquid wetting agent at 25° C. is added to the abrasive grit in a metal pan and mixed with a spatula until each grit grain is wetted. A mixture of cryolite filler and the powdered resin mixed with sufficient hexamethylenetetramine to harden the novolak resin is passed through a sifter three times and deposited onto a piece of Kraft paper. The wetted grit is then dumped onto this dry powder mix and coated by tumbling with a see-saw action of the Kraft paper and scuffing with the hands. Initial mix agglomeration is broken up by passing through a wide mesh screen. Kraft paper tumbling is continued until coating is complete and there is very little, if any, residual powdered resin. The ratio of powdered to liquid resin used is considered proper when the abrasive mix remains free flowing up to the time it is charged to the mold.

Six equal portions of the resultant mix are then each charged to a 6″ x 1″ x ½″ mold cavity, leveled, and cold molded to a density of 47.5 grams/cubic inch (2.93 g./cc.) using 30 tons ram pressure. The abrasive test structures are then cured with a standard 24 hour stepwise cycle; 10 hours from 150° F. to 365° F., 12 hour hold at 365° F. and a 2 hour cooling period.

Three abrasive structures each are tested in flexural strength at 25° C. and 260° C. and according to ASTM D-790-61. The average values are reported below.

TABLE II

| Powdered | Test, °C. | Flexural Strength, p.s.i. | | Percent Improvement |
|---|---|---|---|---|
| | | Unmodified Phenolic Resin | Modified Polyhydroxyether Phenolic [1] | |
| Fine [2] | 25 | 3,553 | 5,343 | 50 |
| Coarse [3] | 25 | 3,553 | 5,553 | 56 |
| Fine [2] | 260 | 1,600 | 1,692 | 6 |
| Coarse [3] | 260 | 1,600 | 2,344 | 46 |

[1] Containing about 12% polyhydroxyether.
[2] Fine—Micronized, powder density of 0.26–0.29 g./cc.; sieve analysis, 97–99% through 200 mesh screen.
[3] Coarse—Micropulverized, powder density of 0.43–0.47 g./cc.; sieve analysis, 76–78% through 200.

Polyhydroxyether modified phenolic with an apparent powder density of 0.43–0.47 g./cc. gives an optimum balance of room temperature and hot strength improvement over heat resistant unmodified phenolic resin binders. With a reduction in powder density or resin particle size, room temperature strength stays essentially constant but hot strength drops progressively. At high powder densities or coarser particle size, polyhydroxyether modified phenolic hot strength stays essentially constant but room temperature strength increases.

Example 2

The effect of varying the ratio of powdered to liquid phenolic resin is shown in Table III.

TABLE III

| Powdered Novolak Phenolic Resin/ Liquid Resole Phenolic Resin (parts) | Flexural Strength, p.s.i. | |
|---|---|---|
| | At 25° C. | At 260° C. |
| 80[1]/40 | 3,386 | 2,117 |
| 84[2]/36 | 5,315 | 3,096 |
| 94[2]/26 | 5,936 | 3,017 |

[1] Unmodified phenolic resin.
[2] Polyhydroxyether modified phenolic resin.

Flow promoters can also be incorporated into the compositions of this invention to decrease the melt viscosity for particular end uses. Bisphenol-A is suitable for this purpose as well as other phenols such as phenol itself and hexatriphenol.

Example 3

Phenolic resin binder systems for abrasive structures can be made up of a 2-step novolak alone or a 2-step novolak/1-step resole resin mixture. Formaldehyde in any of its forms, such as, paraform and trioxane or a compound containing available formaldehyde, such as, hexamethylenetetramine or methylol containing resin is needed to provide the necessary cross-links to thermoset the 2-step novolak.

In practice, the grinding wheel industry prefers hexamethylenetetramine hardened 2-step phenolic novolak binders and so its effect on polyhydroxyether modified novolaks is shown in Table IV, which contains flexural strength data, using the grinding wheel composition and cure conditions described in Example 1 at two levels of hexamethylenetetramine and polyhydroxyether.

TABLE IV

| Polyhydroxyether in Phenolic Novolak Resin | Percent [1] Hexamethylene-tetramine (Hexa) | Flexural Strength | | Ratio of Strength, R.T./hot [2] |
|---|---|---|---|---|
| | | P.s.i. at— | | |
| | | 25° C. | 260° C. | |
| | 7 | 3,620 | 515 | 7.0 |
| | 10 | 3,386 | 2,117 | 1.6 |
| 12 | 7 | 6,482 | 916 | 7.0 |
| 12 | 10 | 6,229 | 3,359 | 1.8 |
| 20 | 7 | 7,059 | 1,682 | 4.2 |
| 20 | 10 | 6,703 | 3,050 | 2.2 |

[1] Percent Based on weight of phenolic novolak.
[2] Ratio of room temperature flexural strength (25° C.) to hot flexural strength (260° C.).

A hexamethylenetetramine level of about 10% to 15% gives an optimum room temperature and hot strength balance for snagging wheel type structures. Here, high hot strengths are required.

In foundry wheel applications, however, a higher room temperature and lower hot strength balance is required. The use of lower hexamethylenetetramine contents provides for structures with higher ratios of R.T./hot strength.

The use of a greater than 15% hexa content results in lower room temperature strengths and equivalent or lower hot strengths.

For general applications, however, polyhydroxyether modified 2-step phenolic novolaks, having hexamethylenetetramine or other methylene engendering hardening agents contents in the range of about 2 to 50% (based on the weight of novolak) have merit in grinding wheel applications. A preferred range is about 3 to 20% with about 7 to 15% being particularly preferred.

Example 4

The effect of the concentration of thermoplastic polyhydroxyether on the flexural strength of grinding wheel compositions is delineated in Table V, using the basic grinding wheel compositions and cure conditions described in Example 1, except for the variations in polyhydroxyether content.

TABLE V

| Percent Polyhydroxyether in Novolak Composition | Flexural Strength | | | |
|---|---|---|---|---|
| | P.s.i. at 25° C. | Percent Increase | P.s.i. at 260° C. | Percent Increase |
| (1) | 3,246 | | 1,870 | |
| 2 5 | 3,531 | 9 | 2,893 | 55 |
| 2 9 | 4,089 | 26 | 2,674 | 43 |
| 2 10 | 4,665 | 44 | 2,706 | 45 |
| 2 50 | 5,877 | 81 | 2,126 | 14 |
| 3 10 | 5,744 | 77 | 2,836 | 52 |
| 3 12 | 5,928 | 83 | 3,199 | 71 |

1 Control (no polyhydroxyether).
2 Polyhydroxyether and novolak blended via 2 roll hot mill at 180–250° F.
3 Polyhydroxyether is added at the end of the preparation of the novolak in the reactor before isolation of the novolak via hot melt still addition As can be seen in Table V, the hot melt solution of polyhydroxyether in a phenolic novolak is the more effective and preferred method of modification. Improvements can be effected with polyhydroxyether levels in the range of 0.25% to 60% based on the weight of phenolic novolak. The preferred range of polyhydroxyether is about 5 to 20% by weight.

Example 5

The effect of various polyhydroxyethers on the grinding wheel heat resistance is shown in Table VI with samples prepared by the method of Example 1.

TABLE VI

| Percent Polyhydroxyether in Novolak Composition | Flexural Strength | | | | |
|---|---|---|---|---|---|
| | P.s.i. at 25° C. | Percent Increase Over Control | P.s.i. at 260° C. | Percent Increase Over Control | Percent R.T. Strength Retained |
| 1 0 | 3,246 | | 1,870 | | 57 |
| 2 9 | 4,089 | 26 | 2,674 | 43 | 65 |
| 3 10 | 4,261 | 31 | 3,107 | 66 | 73 |
| 4 9 | 3,699 | 14 | 2,630 | 41 | 71 |
| 5 9 | 4,035 | 24 | 3,149 | 69 | 78 |

1 Control.
2 Polyhydroxyether derived from bisphenol-A (melt flow=1–6).
3 Polyhydroxyether derived from bisphenol-A base (melt flow=30).
4 Polyhydroxyether derived from 1,2-bis(p-hydroxyphenyl)-1-methyl-4-isopropylcyclohexane.
5 Polyhydroxyether derived from bisphenol-A base (melt flow=1–6) plus 4% phenol blocked toluene diisocyanate crosslinker.

Heat resistance in an abrasive test structure as indicated by flexural hot (260° C.) strength and the percent of room temperature (R.T.) strength retained when tested hot. Therefore, a resin imparting higher hot strength and/or a greater percent R.T. strength retention is considered to impart greater heat resistance to the abrasive structure.

Greater heat resistance, as measured by both hot strength and percent R.T. strength retention was obtained with a lower molecular weight (higher melt flow) polyhydroxyether and cross-linked low melt flow polyhydroxyether.

Example 6

The effects of resin cure time and temperature variations are shown in Table VII comparing the composition of Example 1 with unmodified novolak as control.

The standard cure cycle which calls for a 12 hour hold at 365° F. has been found to give the optimum balance of room temperature and hot strength for the unmodified novolak control.

The polyhydroxyether modified resin, however, provided the same relative strength improvement with a shorter cure cycle and much higher (66%) hot strengths with a higher top post cure temperature. In addition, the higher final cure series gave a higher percent R.T. strength retention.

Example 7

The heat resistance of the polyhydroxyether modified composition described in Example 1 was compared with unmodified novolak resin. The data obtained and shown in Table VIII demonstrate the polyhydroxyether modified novolak resin heat resistance as measured by structural hot strength is much higher and that the modified novolak is more stable than that of unmodified novolak. Regardless of the specific time/temperature cure cycle employed, modified resin hot strength was 40%–100% greater than unmodified.

TABLE VIII

| Final Cure State 1 | Flexural Strength at 260° C., p.s.i. | |
|---|---|---|
| | Polyhydroxyether Modified Novolak | Unmodified Novolak |
| 300° F.: 4 hrs | 2,851 | 2,212 |
| 365° F.: | | |
| 2 hrs | 3,090 | 1,376 |
| 4 hrs | 3,257 | 1,624 |
| 8 hrs | 3,263 | 1,332 |
| 400° F.: | | |
| 4 hrs | 3,294 | 2,242 |
| 8 hrs | 3,340 | 1,839 |
| 460° F.: | | |
| 2 hrs | 2,931 | 2,444 |
| 4 hrs | 3,663 | 2,633 |
| 8 hrs | 3,617 | 2,788 |
| 520° F.: | | |
| 2 hrs | 3,086 | 2,459 |
| 4 hrs | 3,326 | 2,368 |
| 8 hrs | 3,435 | 2,479 |

1 Initial cure of 173–345° F. in 8 hours.

Example 8

For use in heavy duty grinding wheel applications, compositions containing sintered aluminum oxide grain were compounded with the polyhydroxyether modified novolak described in Example 1 and compared with unmodified novolak resin. In addition, furfural (20 parts) was used in one experiment with calcium oxide (3 parts) in place of the liquid resole resin of the composition described in Example 1. These data are presented in Table IX.

TABLE IX

| Aluminum Oxide Grit Type | Resin | Flexural Strength | | | |
|---|---|---|---|---|---|
| | | P.s.i. at 25° C. | Percent Increase | P.s.i. at 260° C. | Percent Increase |
| Fused 1 | Unmodified novolak.3 | 3,386 | | 2,117 | |
| Do | Polyhydroxyether modified novolak.3 | 5,315 | 57 | 3,096 | 47 |
| Sintered 2 | do 3 | 7,036 | 110 | 3,243 | 53 |
| Do | do 4 | 7,634 | 125 | 3,882 | 85 |

1 Carborundum Co. "Aloxite" grain.
2 Norton Co. "Alundum 75 A" grain.
3 Containing liquid resole wetting agent.
4 Containing furfural wetting agent (20 parts) with 120 parts of powdered novolak.

In certain heavy duty wheel applications, those structures containing a lower percentage of voids (porosity)

TABLE VII

| Final Cure Stage 1 | Resin | Flexural Strength | | | | |
|---|---|---|---|---|---|---|
| | | P.s.i. at 25° C. | Percent Increase | P.s.i. at 260° C. | Percent Increase | Percent R.T Strength Retention |
| 12 hrs. at 365° F | Unmodified Novolak Control | 3,386 | | 2,117 | | 62 |
| 12 hrs. at 365° F | Example 1 Composition | 5,315 | 57 | 3,096 | 47 | 59 |
| 6 hrs. at 365° F | do | 4,936 | 46 | 3,015 | 43 | 62 |
| 6 hrs at 365° F. plus 4 hrs at 450 F. | do | 5,000 | 48 | 3,505 | 66 | 70 |

1 Initial cure of 150° F. to 365° F. in 10 hours.

have been found to give the best performance. The application of heat and pressure (hot pressing) as opposed to pressure alone (cold pressing) promotes greater resin flow and wetting of the abrasive grit thereby reducing structure porosity.

Example 9

For some heavy duty grinding wheel applications, structures containing a lower percentage of voids than obtained with cold pressing are desirable. A series of experiments was conducted wherein hot pressing was used to form the test specimens because of the enhanced resin flow and wetting of the abrasive grit achieved which acts to reduce porosity of the resultant structure. The composition described in Example 1 was used but a density of 3.03 g./cc. was attained by using hot molding conditions i.e., 315–320° F. for ten minutes instead of the cold pressed method. The standard 24 hour cure cycle of Example 1, however, was the same. Furfural (20 parts) and calcium oxide (3 parts) was also evaluated as a substitute for the liquid resole in the Example 1 composition. The results are presented in Table X.

TABLE X

| Wetting Agent Component | $Al_2O_3$ Grit | Test Temp., °C. | Flexural Strength | | Percent Strength Increase |
|---|---|---|---|---|---|
| | | | Unmodified Novolak, p.s.i. | Polyhydroxyether Modified Novolak, p.s.i. | |
| Liquid resole.. Fused...... | | 25 | 1,750 | 2,699 | 55 |
| | | 260 | 1,230 | 1,327 | 8 |
| Furfural........do...... | | 25 | 2,321 | 3,910 | 68 |
| | | 260 | 1,556 | 1,776 | 14 |
| Liquid resole.. Sintered.... | | 25 | 2,077 | 4,298 | 100 |
| | | 260 | 1,453 | 1,987 | 37 |

Regardless of the type of wetting agent or abrasive grit used, polyhydroxyether modified novolak provided a 55–100% room temperature strength improvement over unmodified novolak using either liquid resole or furfural as the wetting agent component. The hot strength improvement was in the range of 8–37%.

Although the invention has been described in its preferred forms with a certain degree of particularity, it is understood that the present disclosure has been made only by way of example, and that numerous changes may be resorted to without departing from the spirit and scope of the invention.

Example 10

When Example 1 is repeated with the exception that the liquid resole phenolic resin is omitted, an abrasive composition is also obtained suitable for the fabrication of grinding wheels.

What is claimed is:
1. A grinding wheel comprising a shaped and hardened composition consisting essentially of:
 (a) a major amount of abrasive grains selected from the group consisting of aluminum oxide, natural corundum, silicon carbide and diamond;
 (b) about 1 to 48 percent of a solid novolak resin based on the weight of the total composition;
 (c) about 2 to 50% by weight of a methylene engendering hardening agent, based on the weight of novolak resin;
 (d) from 0 to about 100 parts, per hundred parts of said novolak resin, of at least one wetting agent selected from the group consisting of liquid resole resin, cresol, furfural, and furfuryl alcohol;
 (e) from about 0.5 to 60 parts, per hundred parts of novolak resin, of a thermoplastic polyhydroxyether reaction product of substantially equimolar amounts of a dihydric phenol and epichlorohydrin, said thermoplastic polyhydroxyether having a degree of polymerization of at least 30; and
 (f) from 0 to about 200 parts, per hundred parts of novolak resin, of filler.
2. The grinding wheel claimed in claim 1 wherein the abrasive is aluminum oxide.
3. The grinding wheel claimed in claim 1 wherein the wetting agent is a liquid resole resin and the methylene engendering hardening agent is hexamethylenetetramine.
4. The grinding wheel claimed in claim 1 wherein the novolak resin is a phenol-formaldehyde condensation product.
5. The grinding wheel claimed in claim 1 wherein the dihydric phenol is 2,2-bis(4-hydroxyphenyl)propane.
6. The grinding wheel claimed in claim 1 wherein the filler is cryolite.

References Cited

UNITED STATES PATENTS

| 2,317,650 | 4/1943 | Stratford | 51—298 |
| 3,048,482 | 8/1962 | Hurst | 51—298 |
| 3,113,006 | 12/1963 | Kibbey | 51—298 |
| 3,177,090 | 4/1965 | Bayes et al. | 117—72 |

DONALD J. ARNOLD, *Primary Examiner.*